United States Patent

[11] 3,583,253

| [72] | Inventors | Edward Michael Grimshaw; Frederick William Stubbs, both of Luton, England |
|---|---|---|
| [21] | Appl. No. | 829,444 |
| [22] | Filed | June 2, 1969 |
| [45] | Patented | June 8, 1971 |
| [73] | Assignee | The English Electric Company Limited London, England |
| [32] | Priority | May 31, 1968 |
| [33] | | Great Britain |
| [31] | | 26224/68 |

[54] ACTUATORS
9 Claims, 1 Drawing Fig.

[52] U.S. Cl. .................................................. 74/425,
74/421, 192/150
[51] Int. Cl. ................................................. F16h 1/16,
F16h 1/20, F16d 13/22
[50] Field of Search ........................................... 74/425, 412
TL, 421.5, 424.8 VA; 192/89 B, 150

[56] References Cited
UNITED STATES PATENTS

| 1,829,249 | 10/1931 | Beulwitz | 74/425 |
|---|---|---|---|
| 2,225,957 | 12/1940 | Korff | 74/425 |
| 3,148,556 | 9/1964 | Gibbs et al. | 74/325 |
| 3,339,426 | 9/1967 | Borggraefe | 74/425 |
| 3,408,880 | 11/1968 | Stiles | 74/411X |
| 3,466,945 | 9/1969 | McNeal, Jr. | 74/424.8(VA) |

*Primary Examiner*—Leonard H. Gerin
*Attorneys*—Misegades and Douglas, Keith Misegades and George R. Douglas, Jr.

ABSTRACT: This invention relates to actuators of the kind including a drive motor coupled through reduction gearing to an output shaft. In the new layout provided by the invention, a worm shaft of the gearing lies parallel to the motor shaft and is driven by the motor via gear wheels which can be readily removed to enable gear wheels of different sizes to be fitted to provide different overall gear ratios. The gear wheels lie outside the casing of the actuator.

The actuator has a flameproof spigot joint between the casing and a subsidiary housing mounted on the casing. The casing and the housing have flanges one of which has projections to provide gaps between the flanges into which a tool can be inserted to help in separating the housing from the casing.

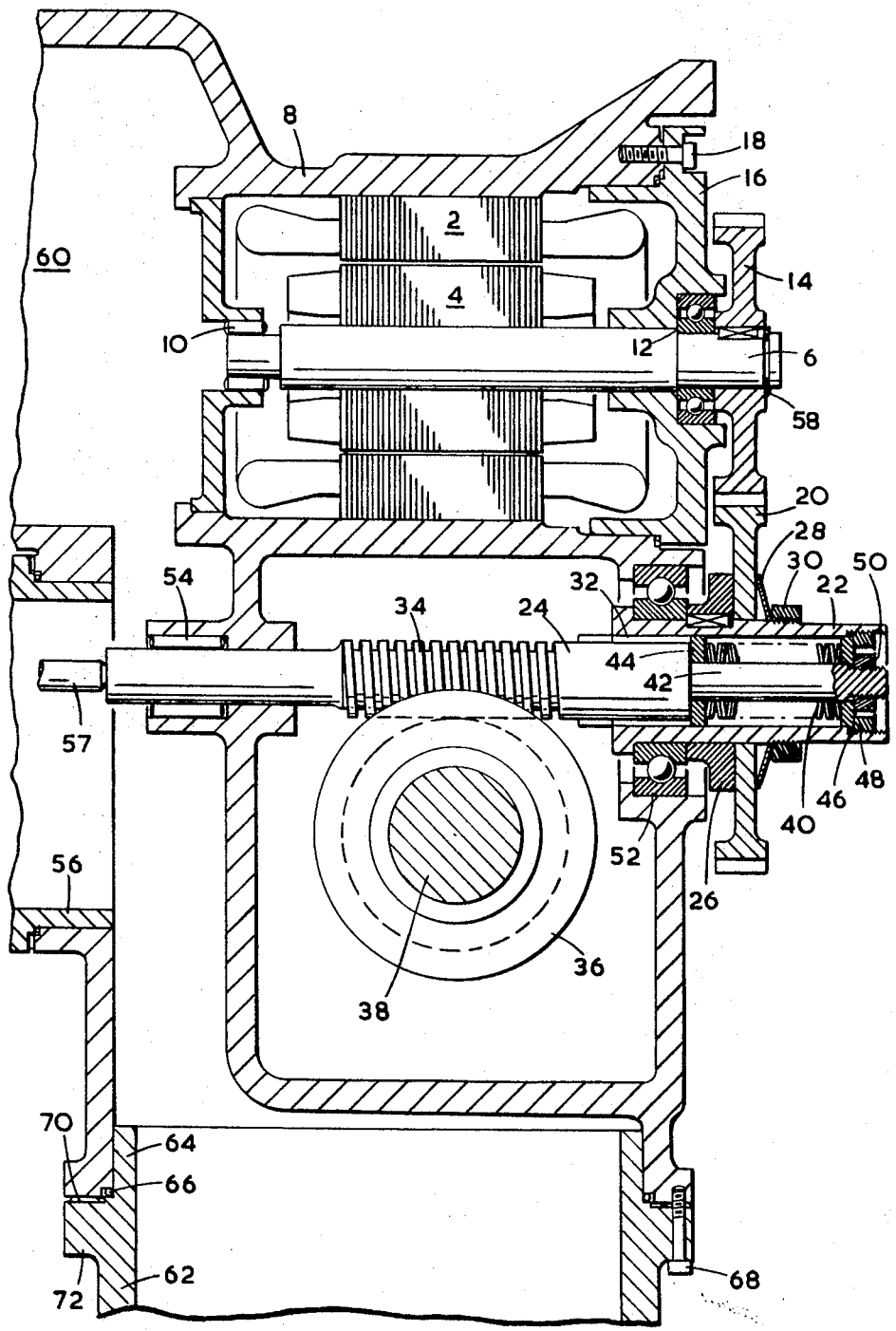

ACTUATORS

This invention relates to actuators including a drive motor coupled through gearing to an output shaft which may, for example, carry a nut to engage a threaded spindle for controlling a valve.

An actuator according to the invention includes a drive motor having a first shaft; a worm gear on a second shaft which is parallel to said first shaft; intermeshing first and second gear wheels on said first and second shafts respectively, said gear wheels being readily removable from the respective shafts to enable gear wheels of different sizes to be used for different overall gear ratios; and an output shaft driven by said worm gear.

This invention enables a given actuator to be used for different output speeds. All that is needed is that the appropriate pair of intermeshing gear wheels be secured respectively to the first and second shafts.

An example of an actuator according to the invention is shown in the accompanying drawing.

The actuator includes an electric motor consisting of a stator 2 and a rotor 4 which is mounted on a motor shaft 6. The stator is housed in a casing 8. The shaft 6 is mounted in bearings 10 and 12 and overhangs the bearing 12 so as to be able to carry a gear wheel 14 which is keyed to the shaft 6. The bearing 12 is mounted in an end part 16 of the casing secured by screws 18. There is a flameproof joint between the part 16 and the casing 8, of a kind which will be described further on.

A gear wheel 20 meshing with the gear wheel 14 surrounds a tubular part 22 and drives a worm shaft 24 via a friction clutch. This clutch consists of a member 26 which is keyed to the tubular part 22 and towards which the gear wheel 20 is firmly urged by a conical spring washer 28 compressed by a nut 30. The tubular part 22 has a spline or key connection 32 with the worm shaft 24.

A worm 34 meshes with a worm wheel 36 which drives a hollow output shaft containing a nut (not shown) meshing with a threaded spindle 38.

The spline or key connection 32 between the tubular member 22 and the worm shaft 24 allows the worm shaft to move axially with respect to the member 22. Such axial movement is however restrained by a spring pack consisting of a stack of Belleville washers 40 surrounding a reduced-diameter part 42 of the shaft 24. When the shaft 24 moves to the right, it carries with it a collar 44, while a collar 46 remains stationary by virtue of engaging an externally threaded ring 48 screwed into the tubular part 22. On the other hand, when the shaft moves to the left, a nut 50 screwed on the end of the shaft carries with it the collar 46, while the collar 44 remains stationary by virtue of engaging the end of the spline or key formation in the tubular part 22. In either direction of movement the spring pack is compressed and therefore resists the movement.

The worm shaft 24 is rotatably mounted by means of ball bearing 52 surrounding the tubular part 22, and by a needle roller bearing 54 at the opposite end of the shaft.

Axial movement of the shaft 24 against the resistance of the spring pack 40 occurs when an excessive torque load is placed on the output shaft of the actuator. In order to safeguard the actuator, a switch mechanism (not shown) is housed in a box 56 and this mechanism includes a rod 57 which bears against the end of the shaft 24 and operates torque-limiting switches to cut out the motor when the torque (as represented by the axial displacement of the shaft 24) reaches a predetermined limit value in either direction. It will be appreciated that the spring pack formed by the Belleville washers 40 is precompressed so that no axial movement of the shaft 24 occurs until the torque approaches the limiting value.

The switch mechanism contained in the box 56 also includes position switches which are operated at predetermined positions of the output shaft, or after a predetermined number of revolutions of the output shaft. The drive for the position switches is obtained through a shaft which is parallel to the worm shaft 24 and has a gear meshing with an appropriate gear formation on the output shaft of the actuator. All of these have been omitted for the sake of clarity.

In order to change the gear ratio and consequently the output speed of the actuator, the gear wheels 14 and 20 are readily removable. The gear wheel 14 is retained simply by a circlip 58, while the gear wheel 20 is retained by the nut 30. It will be appreciated that the gear wheels shown can be replaced by intermeshing gear wheels of different sizes to provide a different overall gear ratio. In use the actuator may be stored initially without any gears and may be tested by fitting over the motor shaft 6 and tubular member 22 a pair of dummy gears in a test rig. When the necessary gear wheels are finally fitted to suit the particular needs of the user, a cap (not shown) is secured over the gear wheels to enclose them.

Part of the basic casing structure of the actuator defines a terminal box 60. The actuator also includes a further box 62 which houses control gear.

The joint between the box 62 and the actuator casing is made in a flameproof manner by virtue of a flange part 64 at the end of the box 62 fitting closely within the mouth of the casing. The length of the flange and the clearance between the flange and the surrounding part of the casing is in accordance with British Standard 229:1957 in order to provide the necessary flameproof characteristics. Moreover, in order to prevent the entry of moisture, a rubber O-ring 66 is axially compressed between cooperating flat surfaces on the box and casing so as to form a watertight seal.

The box 62 is secured to the casing by a number of screws 68. These are tightened so as to bring circumferentially spaced projections 70 on a flange 72 on the box firmly into contact with a flat end face of the casing. The provision of projections, instead of a continuous flat annular surface, facilitates machining and also facilitates removal of the box because a screwdriver or other device can easily be inserted into any of the gaps between the projections to assist in levering off the box; moreover, the limited contact area of the projections with the casing reduces the degree to which the contacting surfaces "stick" together after a prolonged period of contact.

A similar flameproof joint is formed between the end part 16 (adjacent to the motor) and the casing 8, and a further similar flameproof joint is formed between the box 56 (enclosing the switch mechanism) and the casing 8.

We claim:

1. An actuator including a drive motor having a first shaft; a worm gear on a second shaft which is parallel to said first shaft; intermeshing first and second gear wheels on said first and second shafts respectively, said gear wheels being readily removable from the respective shafts to enable gear wheels of different sizes to be used for different overall gear ratios; an output shaft driven by said worm gear, wherein said second shaft includes a main portion and a tubular portion which are in driving engagement and which are arranged for relative axial sliding movement in either direction from a normal relative position in response to torque applied to said output shaft.

2. An actuator as claimed in claim 1, including a friction clutch connecting said second gear wheel to said second shaft.

3. An actuator as claimed in claim 2, in which the clutch includes a member attached to said second shaft and means to urge a face of said second gear wheel into contact with the member.

4. An actuator as claimed in claim 1, including resilient means which resists said axial sliding movement so that substantially no axial sliding movement occurs until a predetermined level of torque on said output shaft is reached.

5. An actuator as claimed in claim 1, in which the motor and the worm gear lie within a casing and said first and second shafts extend from the casing so that said first and second gear wheels lie outside the casing.

6. An actuator as claimed in claim 5, including a subsidiary housing mounted on the casing.

7. An actuator as claimed in claim 6, in which the housing and the casing have flanges for mounting the housing on the casing, one of which flanges has projections to space it from the other flange.

8. An actuator as claimed in claim 1, including means to indicate the angular position of the output shaft.

9. An actuator as claimed in claim 1, in which the output shaft carries a threaded member to engage a threaded spindle for controlling a valve.